(12) United States Patent
Refaeli et al.

(10) Patent No.: US 7,937,065 B2
(45) Date of Patent: May 3, 2011

(54) SYSTEM AND METHOD FOR COMMUNICATING OVER NEUTRAL POWER LINES

(75) Inventors: Rami Refaeli, Kfar-Saba (IL); Jacob Keret, Kfar-Shemaryahu (IL)

(73) Assignee: Main.Net Communications Ltd., RaAnana (IL)

( * ) Notice: Subject to any disclaimer, the term of this patent is extended or adjusted under 35 U.S.C. 154(b) by 810 days.

(21) Appl. No.: 11/898,289

(22) Filed: Sep. 11, 2007

(65) Prior Publication Data

US 2008/0063093 A1 Mar. 13, 2008

Related U.S. Application Data

(60) Provisional application No. 60/825,147, filed on Sep. 11, 2006.

(51) Int. Cl.
*H04M 9/00* (2006.01)

(52) U.S. Cl. ............... 455/402; 340/310.11; 340/310.12

(58) Field of Classification Search ........................ None
See application file for complete search history.

(56) References Cited

U.S. PATENT DOCUMENTS

| 5,257,006 | A | 10/1993 | Graham et al. |
| 5,485,040 | A | 1/1996 | Sutterlin |
| 5,933,073 | A | 8/1999 | Shuey |
| 6,404,773 | B1 * | 6/2002 | Williams et al. .............. 370/463 |
| 6,407,987 | B1 | 6/2002 | Abraham |
| 7,286,026 | B2 * | 10/2007 | Law .............................. 333/124 |
| 2002/0171535 | A1 * | 11/2002 | Cern ........................ 340/310.07 |
| 2003/0160684 | A1 * | 8/2003 | Cern ........................ 340/310.01 |
| 2005/0111533 | A1 * | 5/2005 | Berkman et al. .............. 375/220 |
| 2007/0076505 | A1 | 4/2007 | Radtke et al. |
| 2008/0258882 | A1 * | 10/2008 | Lester et al. ............. 340/310.12 |
| 2008/0297327 | A1 * | 12/2008 | Zitting et al. ............ 340/310.18 |

FOREIGN PATENT DOCUMENTS

| GB | 2048622 | 12/1980 |
| WO | WO 92/16920 | 10/1992 |
| WO | WO 98/20658 | 5/1998 |

* cited by examiner

*Primary Examiner* — Ajit Patel

(57) ABSTRACT

A system for transmitting data over power lines between a plurality of communication boxes, wherein each box is coupled to a neutral line such that at least one box can modulate data onto the neutral line and at least a second box can read modulated data off the neutral line. Accordingly, the system enables data to be transmitted over neutral lines, without requiring coupling to hot lines.

19 Claims, 3 Drawing Sheets

US 7,937,065 B2

SYSTEM AND METHOD FOR COMMUNICATING OVER NEUTRAL POWER LINES

RELATED APPLICATION

This application claims the benefit of U.S. Provisional Patent Application No. 60/825,147 filed Sep. 11, 2006, the contents of which are incorporated herein by reference.

FIELD OF THE INVENTION

The invention, in some embodiments thereof relates to transmission of data over power lines.

BACKGROUND OF THE INVENTION

It is generally known to use power lines and power line networks to transmit data. An industry standard protocol referred to as CEBus has been established for data transmission between appliances, sensors and control devices in a household over the power network in the household. Utility companies use power lines to transmit data to control and monitoring base stations from sensors that monitor power line equipment, such as transformers and switches, and/or power line operating conditions at different locations along a power line.

Transmitters and receivers (hereinafter denoted collectively as "T/R"s) used to transmit and receive data over a low power line network (up to about 250 volts), such as a typical household network, are often electrically connected to power lines in the network via direct conductive contact with the power lines.

U.S. Pat. No. 5,933,073 to Shuey, the disclosure of which is incorporated herein by reference, describes a communication system that transmits data over power lines in a household power network in which T/Rs are connected via conductive contacts to a power line and a ground line in the network. U.S. Pat. No. 5,485,040 to Sutterlin, the disclosure of which is incorporated herein by reference, describes a communication system in which "power line communication apparatus" is electrically connected via conductive contacts to the "hot" line and neutral line of a power network of a household to transmit data over the network.

Russian Patent SU 554623, the disclosure of which is incorporated herein by reference, describes a system for generating signals on power lines of a first power line network responsive to signals received on power lines of a second power line network. The first and second power line networks are connected by a power transformer and the system routes the signals from the second power line network around the power transformer. Signals on the second power network are inductively sensed. The system is coupled to power lines in the first power line network using conductive contacts.

PCT Publication WO 98/20658, the disclosure of which is incorporated herein by reference, describes a "Non-Invasive Powerline Communication System" in which T/Rs are coupled capacitively or inductively to a power line in a power line system to transmit and sense signals. Signals are transmitted between a first and a second T/R over a same single power line to which both the transmitting and receiving T/R are coupled. To mount a T/R on a power line, the T/R is stressed mechanically to enlarge an opening in the T/R through which the power line is passed into the T/R. The publication states that it is an object of the invention that the T/R be capable of being installed inexpensively and safely without interrupting service to the customer.

Further systems for inductive and capacitive coupling of a T/R to a power line are described, for example, in PCT publication WO 92/16920, the disclosure of which is incorporated herein by reference.

U.S. Pat. No. 6,407,987 to Abraham, the disclosure of which is incorporated herein by reference, describes couplers that have capacitive circuits serially connected with an air-core transformer. One of the described couplers is a differential capacitive coupler.

Not all coupling methods suitable for low voltage wires (e.g., up to about 250 Volts) may be used for medium voltage wires, i.e., above 2000 volts, generally above 6000 volts. For example, wires carrying higher voltages generally require larger capacitors which add higher distortion levels. In addition, the distance between high voltage wires is generally larger than for low voltage wires and therefore requires a relatively long wire length between the T/R and the high voltage wires. Such long wires generally add high distortion levels (e.g., phase skew) to the transmitted signals.

UK patent application GB 2,048,622, the disclosure of which is incorporated herein by reference, describes a device for reducing the amplitude of a signal in a conductor, in order to allow detection of one wire from a group of wires, without signals from the other wires interfering in the detection. The device includes an inductive sensor for sensing signals from the wire and an inductive signal injector to apply a counter signal to the wire.

US Patent Application 2007/0076505 the disclosure of which is incorporated herein by reference describes a method of providing communications over a medium voltage power line having a plurality of segments. The aforesaid method comprises steps amplifying data signal in passing from one segment of power line to another.

U.S. Pat. Nos. 5,592,914 and 5,257,006, the disclosures of which are incorporated herein by reference, describe transmitting data signals using both hot and neutral lines and using a signal choke to reduce noise.

SUMMARY OF THE INVENTION

An aspect of some embodiments of the Invention relates to data communications over power transmission lines in which data is transmitted over a neutral line. In an exemplary embodiment of the invention, the voltage of the distribution network of which the neutral line is a part is above 300V, optionally above 1000V, optionally above 3000V, optionally above 10,000V, optionally above 20,000V, optionally above 35,000V or intermediate voltages. In an exemplary embodiment of the invention, the transmission lines are medium voltage transmission lines. In an exemplary embodiment of the invention, data is not transmitted over a hot line. Optionally, this allows for faster setting up and/or simpler and/or lower cost coupling elements. Optionally, the ground is used as a common return. Optionally or alternatively, data is transmitted using two or more neutral lines. In an exemplary embodiment of the invention, the neutral line is selectively grounded or shorted to another neutral line at low frequencies, substantially lower than data modulation frequencies. In an exemplary embodiment of the invention, selective grounding or shorting is provided by using an inductive element between the neutral line and the ground. Optionally, an induction of an existing link is enhanced by adding a ferrite core (e.g., in the form of a bead or slotted bead) which increases the induction of a grounding line so that high frequencies do not pass on the line. In an exemplary embodiment of the invention, a core is provided between a communication box and a ground line, alternatively or additionally, to a core between a neutral wire and a grounding connection.

An aspect of some embodiments of the invention relate to a method of installing a powerline communication device, in which an existing set up, for example, a powerline pole, which is grounded, is upgraded to not add noise at high frequencies to a data carrying line. In an exemplary embodiment of the invention, the upgrading comprises mounting a ferrite core (or other induction increasing element) on an existing grounding line and optionally without physically damaging or applying deforming force to the line and/or without substantially disturbing communications along the neutral line. Optionally, the core is clamped. Optionally, the core is a split core that is formed in two parts and mounted on the line and then held together (e.g., with a mounting or a clip) as a single core. Optionally, the grounding wire is wound around the core. In an exemplary embodiment of the invention, a communication box, for example, a modem, is mounted at each medium voltage pole which includes a transformer. Optionally, the grounding of the pole is modified as described herein. Optionally, signal blocking inductors and/or high induction connections are provided on neutral lines in a manner which delimits the data transmission network, for example, to a certain area.

There is provided in accordance with an exemplary embodiment of the invention, a system for transmitting data over power lines, comprising:

(a) an electric power distribution network including at least one hot line, one neutral line and at least one grounding connection between the neutral line and the ground; and (b) a plurality of communication boxes, each box being coupled to said neutral line and each including a modem, so that at least one box can modulate data onto said neutral line and at least a second box can read modulated data off said neutral line, such that said data can be read without coupling to said hot line.

In an exemplary embodiment of the invention, the system comprises an inductance element mounted on said grounding connection and configured to prevent leakage of currents at frequencies used by said modem for said modulation.

Optionally, said element comprises an element mountable on an existing grounding connection without damage thereto.

Optionally, said grounding connection is a high inductance connection configured to prevent leakage of currents at frequencies used by said modem for said modulation.

Optionally, said element comprises a ferrite bead.

Optionally, said power distribution network comprises a low-voltage network.

Optionally, said power distribution network comprises a medium-voltage network.

Optionally, said power distribution network comprises a high-voltage network.

Optionally, said power distribution network comprises a mixed-voltage network.

Optionally, said communication boxes are on opposite sides of a step-down transformer.

Optionally, said communication boxes are each coupled to a plurality of neutral lines for transmission of data thereby.

Optionally, the system comprises at least one high inductance element configured to isolate between at least two of said neutral lines at high frequencies.

Optionally, the system comprises at least a second high inductance element configured to isolate at least one of said neutral lines and said grounding connection.

Optionally, at least one of said communication boxes is additionally coupled to a hot line for transmission of data thereby.

Optionally, said box is coupled to said neutral line by a wire connection.

Optionally, said box is coupled to said grounding connection.

Optionally, the system comprises a network of a plurality of such pairs of boxes adapted for data transmission over a region.

Optionally, said box is coupled to said neutral line by coupler.

Optionally, said box is coupled to said neutral line by a wireless connection.

Optionally, said system is underground and said grounding connection is to a physical ground.

Optionally, said system is based on a medium voltage underground system, with wire shield cables, such that transmission is based on the cable shields instead of or in addition to the neutral wire.

There is provided in accordance with an exemplary embodiment of the invention, a method of transmitting data over an electrical distribution system, comprising:

(a) modulating said data to produce a signal;

(b) injecting said signal into a neutral power line; and (c) reading said signal off said neutral line.

Optionally, the method comprises:

(d) retrofitting an existing electrical distribution system by mounting inductance elements over a plurality of grounding connections of said neutral power line.

Optionally, said data comprises packet data.

Optionally, the method comprises coupling a communication device which performs said modulating to said distribution network without shutting down power distribution on said network and without causing a safety violation.

Optionally, the method comprises not coupling a signal into a hot line for sending of said data.

There is provided in accordance with an exemplary embodiment of the invention, a neutral line communication apparatus, comprising:

(a) a coupler adapted to be connected to a medium voltage neutral line; and (b) a modem adapted to at least read or write data via said coupler to said medium voltage neutral lines.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1:
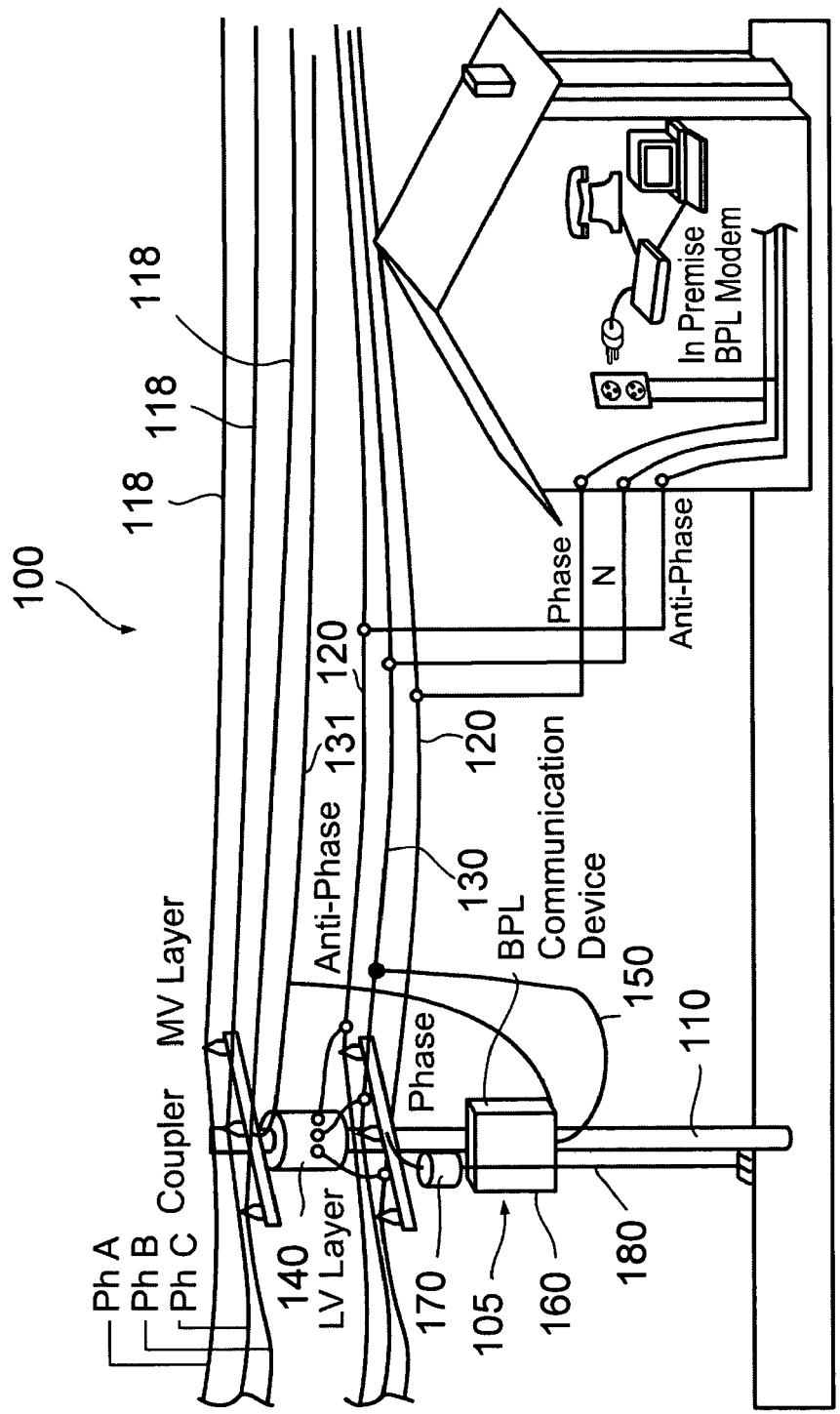
FIG. 1 is a schematic block diagram of a power line communications system using above ground and neutral lines.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The present invention, in some embodiments thereof, relates to transmitting data over power lines, including neutral power lines, using a filtering element to reduce noise on the line.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Reference is now made to FIG. 1 which is a schematic block diagram illustration of an electricity system 100 including one of a plurality of communication devices 105 which enable transmission and/or receiving of data using neutral lines. The devices are optionally remotely disposed from each other as can be seen in FIG. 1. Optionally, the device 105 is located on a power line pole or electricity tower or base 110, which may support a variety of power or transmission lines, for example, one or more low voltage lines 120, one or more medium voltage lines 118, and a neutral line 130, neutral line 131, or any other variety or combination of lines. The neutral line 130, for example, may also be connected to a ground line 180, for example, to ground current flowing through neutral line at selected locations in an electricity system. Typically grounding is provided at power poles and/or transformer stations. Electricity system 100 may include a transformer drum 140, which may be connected to neutral line 130. Optionally, some of the devices provide links to outside the data network, for example to individual subscribers or to other networks (e.g., telephone, cellular, WAN). Optionally, some of the devices act as repeaters. Optionally, substantially all powerline poles with transformers in a network are configured with a communication box. Optionally selected powerline poles with transformers are configured with a communication box, so as to enable signals to be adequately transmitted and received between the various communication boxes.

Communication device 105, optionally includes a communication box 160, optionally in a housing (e.g., water proof, heat proof, highly durable etc.) of device 105, which optionally includes one or more coupling devices adapted to attach to power lines and/or grounding connection. The communication box 160 may include, for example, a communication modem. The communication box 160 may have two or more exiting lines, for example, a line 150 connecting the communication box 160 to the neutral line 130, and an additional line 185 connecting communications box 160 to ground line 180.

According to one embodiment of the invention, at least one core, such as a ferrite core 170, or an alternative element with similar features, is placed on grounding wire 180 between the neutral line 130 and the ground. The core 170 may be for example, a powdered, compressed and/or sintered magnetic material having high resistivity. Alternatively or additionally, other objects or materials characterizing by high resistance at high frequencies may be used. For example, core 170 conducts low frequency current (e.g., 50-60 Hz) from the neutral wire 130 to the ground wire 180, thereby grounding this current. The core 170 simultaneously prevents high frequency current in the data transmittance range, for example, frequencies high enough to transmit data signals, from neutral wire 130 to ground wire 180, thereby allowing the high frequency currents to travel through the neutral wire 130 along the electric system 100 with reduced noise. In some embodiments of the invention high frequency signals may be between, for example, 1-100 MHz, however other frequencies may be used. Low frequencies that may be grounded may be in the range of, for example, 0-100 Hz, however other frequencies may be used. Intermediate frequencies, for example in the kilohertz range may be grounded or used for data, depending on the particular embodiment. Optionally, core 170 prevents the ground from injecting high frequency noise at one or more selected bands of interest. Alternatively or additionally, core 170 prevents the data signal from being bled to the ground and thereby having a reduced propagation distance. Thus, the core element 170 can act as a high frequency filtering element conducting low frequency currents to the ground line 180 and preventing high frequency signals from being grounded. Optionally, the core is placed on an existing grounding wire. Alternatively, a new grounding wire with a core is provided.

Optionally or alternatively, the core is placed on a ground wire. Optionally, cores are provided both on a connection between device 105 and the grounding wire and along the grounding wire, between the device and the ground and/or between a connection of the grounding wire to a neutral wire.

Alternatively to a ferrite, other core compositions may be used, for example, ceramic elements with mixed ferromagnetic materials characterized by high electrical resistivity. In accordance with embodiments of the invention, shape, size and composition of the core 170 are substantially unlimited. Core types, composition, size, number, shape etc. may be selected in accordance with a variety of factors, including, for example, one or more of material, shape of wire, connection possibilities, frequency requirements and/or communication signal requirements. For example, in order to prevent grounding of high frequency signals, an inductor with a relative high impedance may be used, so as to prevent transfer of frequencies in the selected range.

According to an alternative embodiment, one or more devices 105 may be disposed on one or more poles or bases 110 and connected to the system 100. Since the various devices 105 are optionally placed in close association to communication boxes 160, data communication between one or more communication boxes may be enabled, using neutral lines as the primary or only medium for transfer of the communications signals.

In such a way a power lines communication network may be formed substantially using neutral lines to transfer data signals throughout the network. Optionally, the network covers several hundreds or thousands or more of square meters. Optionally or alternatively, the network includes 10, 20, 30, 40 or more (or intermediate numbers of) boxes interconnected. Optionally or alternatively, the distance between two devices is, for example, 10 meters, 100 meters, 300 meters or larger or intermediate distances.

Figure 2:
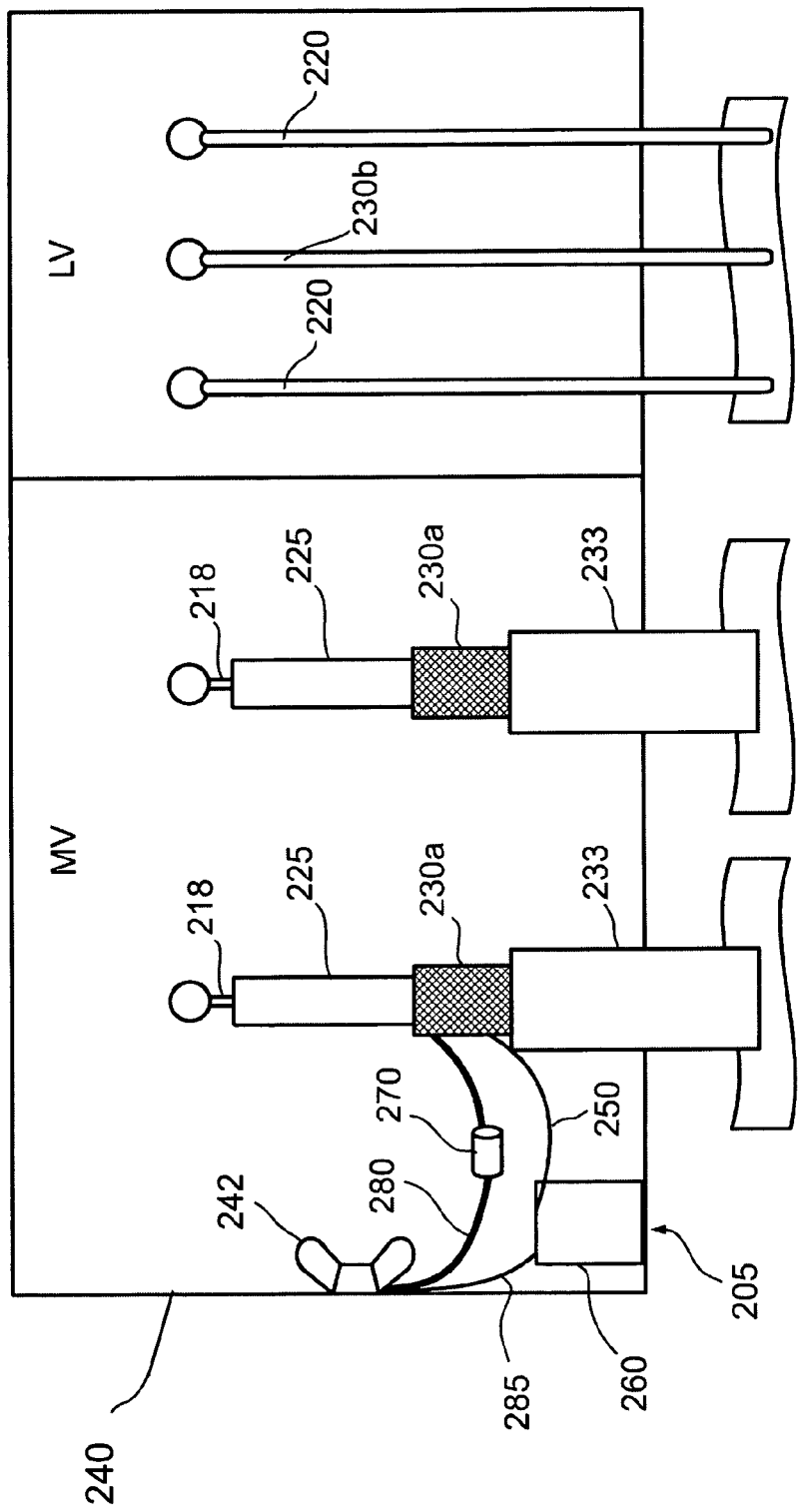
FIG. 2 is a schematic block diagram of a power line communications system using cable shields connected to the neutral line.

Reference is now made to FIG. 2 which is a schematic block diagram illustration of a part of an underground electricity system enabling data communications to be communicated along neutral lines using the underground electricity system. As seen in FIG. 2, a transformer box 240, which is grounded, includes a device 205 which includes a communications box 260. Transformer box 240 may include screw 242, or any other suitable connection mechanism, to secure wires to the box 240. In an exemplary configuration, medium voltage lines 218, one phase or multi-phase (e.g., 3) low voltage lines 220, and neutral lines 230A and 230B are connected to first and second windings of a step-down transformer. The neutral lines 230A and 230B may are connected to the ground line 280. The medium voltage line 218 is insulated by an insulation layer 225. The insulation layer 225 is surrounded by a shield 230A, which functions as the neutral line (hereinafter referred to as 230A) for the medium voltage line 218. The shield 230A is covered by the insulating layer 233. Other configurations of the transformer and lines (or other number of lines) may be used as well.

The device 205 enabling transmitting or receiving data by means of the neutral lines, optionally includes a communication box 260. The box 260 may include, for example, a communication modem. The communication box 260 may have two or more output lines, for example, the line 250 connecting the communication box 260 to the neutral line 230A, and the line 285 connecting communications box 260 to the ground line 280A. In an exemplary embodiment of the invention, a ferrite core 270, or alternative element with similar features, is placed between the cable shields 230a and the screw 242 (or other grounding connector. Optionally, the core is provided integral with the line 285. Optionally, line 285 is wound to provide a desired inductance. Data is optionally transmitted and received through the low voltage line network, the medium voltage line network, or through both networks. Optionally, by using only neutral lines and not power lines, data can pass by a transformer which uses a common neutral line for multiple voltages. Optionally or alternatively, a communication box (not shown) is provided to pass data around the transformer.

Optionally, in this or other embodiments, at least one additional core may be added to the connection between neutral line 230B and the ground wire or ground source.

Optionally, an underground configuration such as described may also be used if there is no transformer, or for ground level or elevated transformers.

In an exemplary embodiment of the invention, an inductance element is provided between a communication box and a grounding wire. Alternatively or additionally, the inductance element is provided between neutral lines and ground, for example, along grounding wire 280.

According to an embodiment of the present invention, the core 270 is adapted to substantially prevent grounding of high frequency signals, for example, signals capable to transmit data through a power line network. For example, data being communicated in electricity system 200, using communications box 260, may be transmitted to neutral line 230A and ground line 280. Data represented by high frequency waves may flow through ground wire 280, yet may be substantially filtered by core 270, thereby preventing the current supporting the data from causing a shortage in the circuit. In this way, for example, communications box 260 may transmit data beyond transformer box 240, using high frequency waves transmitted through neutral lines.

Core 270 may have a shape, size and composition which fits appropriately on the wires or lines being used, and which appropriately filters the current frequencies being used. Core types, composition, size, number, shape and/or other properties may be selected in accordance to a variety of factors, including, for example, one or more of material, shape of wire, connection possibilities, frequency requirements and/or communication signal requirements.

According to an alternative embodiment, one or more apparatuses 205 may be connected to one or more transformer boxes 200. Since the various communications boxes 260 are generally placed in close association (e.g., physically close and/or connected by wired or wireless means, for example, device 205 including a coupler and box 260 including a data processing element) to communication boxes 260, a network may be formed between the communication boxes substantially using neutral lines as the primary medium for transfer of the communications signals. In an exemplary embodiment of the invention, the wireless connection is a short range connection, such as following the Bluetooth standard, a 802.11 standard and/or a point-to-point radio or RF link.

In an exemplary embodiment of the invention, the follow method is used to enable data communications using neutral wires.

(a) A communications box may be connected to a power line pole and/or transformer box, in an over ground and/or underground electricity system.

(b) A first wire from the communications box is connected to a neutral line.

(c) A second wire from the communications box is connected to a ground line.

(d) An inductor is mounted on or around the ground wire or the ground wire is replaced by a high-inductance ground wire, or spliced to include such a wire. Optionally, by mounting a core on a wire, interruption of power (for safety reasons) is avoided.

(e) An inductor or high inductance connect is optionally used between the neutral lien and any grounding thereof.

(f) The neutral communication network is optionally delimited from the rest of the power network using inductors.

(g) Data communications are commenced from the communications box over the neutral line. Alternatively or additionally, data communications may be received by the communications box from the neutral line.

Optionally, at least one of the communication boxes is connected to both hot and neutral lines. For example, part of the network may send data over hot lines and part over neutral lines. Alternatively or additionally, two or more communication boxes may communicate data using both neutral line transmission and hot line transmission, in parallel. In an exemplary embodiment of the invention, however, data is transmitted exclusively over the neutral line (or line) without the need for interfacing with a hot line. For example, the hot line may be used for communicating other data or as a backup (e.g., it may cover only part of the data network or have a reduced bandwidth). In an exemplary embodiment of the invention, a communication box and/or device are configured to not include protection against high voltage, as such voltages are not expected on a neutral line. Optionally or alternatively, the coupler (to the neutral wire) is selected so that it is suitable for low power lines and not for hot lines.

Figure 3:
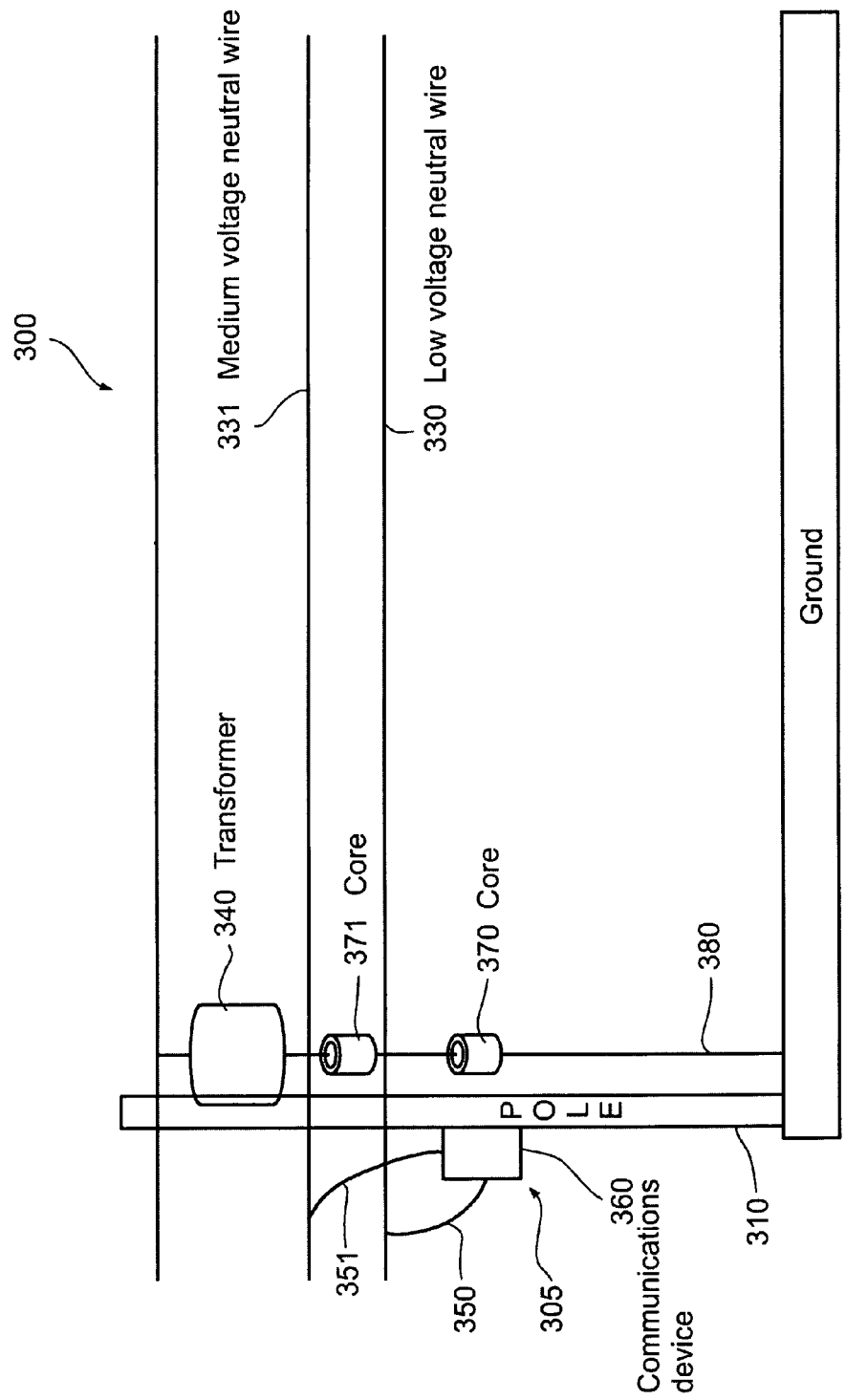
FIG. 3 is a schematic block diagram of a power line communications system using low and middle network neutral lines.

Reference is now made to FIG. 3 which is a schematic block diagram illustration of an electrical system 300 including a system or apparatus 305 to enable transmission or communication of data using two or more neutral lines and optionally without a ground connection. As can be seen in FIG. 3, the apparatus may include a power line pole or electricity tower or base 310, which may support a variety of power or transmission lines, for example, low voltage phase lines and medium voltage phase lines, as well as medium voltage neutral line 331 and low voltage neutral line 330. Neutral line 330 and neutral line 331 may be connected using grounding wire 380, or they may use separate grounding wires. Line 380 may connect transformer 340 to neutral line 331, may connect neutral line 331 and neutral line 330, and/or may connect neutral line 330 to ground. System 300 may include a communications box 360 coupled to powerline pole 310.

In an exemplary embodiment of the invention, system 300 includes a first core, such as a ferrite core 370, or alternative element with similar features, which electrically isolates high frequencies between neutral wire 330 and the ground, for example, the core may be placed on ground wire 380 between neutral line 330 and ground. Alternatively or additionally, system 300 includes a second core which isolates neutral line 330 from line 331, for example, a ferrite core 371, or alternative element with similar features, which is placed on (or formed with) ground wire 380 between neutral line 330 and neutral line 331. Cores 370 and 371 may be for example, powdered, compressed and/or sintered magnetic material having high resistivity. Other suitable objects or materials may be used to increase resistance thereby lowering current losses at high frequencies. For example, cores 370 and 371 may allow low frequency current (e.g., 50-60 Hz) to be conducted between neutral wire 330 and neutral wire 331. Core 370 may simultaneously prevent high frequency current (e.g., Radio band) from being conducted between neutral wires 330 and 331, thereby causing the high frequency currents flowing through neutral wires 330 and 331 to continue being conducted through electric system 300. In this way, core elements 370 and 371 act to prevent high frequency signals from being grounded, and enable these high frequency signals to continue being transmitted through neutral lines 330 and 331 through and beyond electricity system 300. If neutral line 331 is separately grounded, a core may be mounted on a connection to the grounding.

Devices 305, which enable transmission or communication of data using neutral lines, may include a communications box 360. Communications box 360 may include, for example, a communications modem. Communications box 360 may have two or more exiting lines, for example, line 350 connecting communications box 360 to neutral line 330, and line 351 connecting communications box 360 to neutral line 331. According to one embodiment, apparatus 305 may include at least one core 370 and 371, or an alternative element with similar properties, which may be placed on or around ground line 380.

According to an embodiment of the present invention, core 370 may be configured so as to substantially prevent data in the RF range transported in electricity system 300 from being grounded. For example, data being communicated in electricity system 300, using communications box 360, may be transmitted to neutral lines 330 and 331. Data represented by high frequency waves may flow between neutral lines 330 and 331, yet may be substantially filtered by core 370, thereby preventing the current supporting the data from causing a shortage in the circuit. In this way, for example, communications box 360 may transmit data beyond electricity pole 310, using high frequency waves transmitted through neutral lines 330 and 331. Alternatively or additionally to sending data using two neutral lines, two communication systems, each using one of the neutral lines and a ground (or other return) may be used. The two systems may be provided in a single box. Optionally, a core is placed on one or both of the lines connecting the communication boxes to the ground lines, or between the attachment points of the communication box to the grounding wire, so that a commonly used grounding wire does not cause cross-talk between the two communication boxes.

In an exemplary embodiment of the invention, medium voltage cables may be covered by shields 230a and 230b, and these shields may be used to transmit data. In some embodiments data may be transmitted exclusively and/or additionally along the cable shields.

Optionally, one or more apparatuses 305 may be connected to one or more electricity poles or bases 310. Since the various apparatuses 305 are generally placed in close association to communication boxes 360, data communication between one or more communication boxes may be enabled, using neutral lines as the primary medium for transfer of the communications signals.

It is expected that during the life of a patent maturing from this application many relevant inductance elements will be developed and the scope of the term core is intended to include all such new technologies a priori.

As used herein the term "about" refers to ±10%.

The term "comprising" means that other acts, elements and/or ingredients can be added.

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A system for transmitting data over power lines, comprising:
   (a) an electric power distribution network including at least one hot line, one neutral or shield line and at least one grounding connection between the neutral line and the ground;
   (b) a plurality of communication boxes, each box being coupled to said neutral line and each including a modem for one or both of modulation and demodulation, so that at least one box can modulate data onto said neutral line and at least a second box can read modulated data off said neutral line, such that said data can be read without coupling to said hot line; and
   (c) an inductance element mounted on said grounding connection and configured to prevent leakage of currents at frequencies used by said modem for said modulation.

2. A system according to claim 1, wherein said element comprises an element mountable on an existing grounding connection without damage thereto.

3. A system for transmitting data over power lines, comprising:
   (a) an electric power distribution network including at least one hot line, one neutral or shield line and at least one grounding connection between the neutral line and the ground; and
   (b) a plurality of communication boxes, each box being coupled to said neutral line and each including a modem for one or both modulation and demodulation, so that at least one box can modulate data onto said neutral line and at least a second box can read modulated data off said neutral line, such that said data can be read without coupling to said hot line; wherein said grounding connection is a high inductance connection configured to prevent leakage of currents at frequencies used by said modem for said modulation.

4. A system according to claim 1, wherein said element comprises a ferrite bead.

5. A system according to claim 1, wherein said power distribution network comprises a low-voltage network.

6. A system according to claim 1, wherein said power distribution network comprises a medium-voltage network.

7. A system according to claim 1, wherein said power distribution network comprises a high-voltage network.

8. A system according to claim 1, wherein said power distribution network comprises a mixed-voltage network.

9. A system according to claim 1, wherein said communication boxes are on opposite sides of a step-down transformer.

10. A system according to claim 1, wherein said communication boxes are each coupled to a plurality of neutral lines for transmission of data thereby.

11. A system for transmitting data over power lines, comprising:
    (a) an electric power distribution network including at least one hot line, one neutral or shield line and at least one grounding connection between the neutral line and the ground;
    (b) a plurality of communication boxes, each box being coupled to said neutral line and each including a modem, so that at least one box can modulate data onto said neutral line and at least a second box can read modulated data off said neutral line, such that said data can be read without coupling to said hot line; and
    (c) at least one high inductance element configured to isolate between at least two of said neutral lines at high frequencies;
    wherein said communication boxes are each coupled to a plurality of neutral lines for transmission of data thereby.

12. A system according to claim 11, comprising at least a second high inductance element configured to isolate at least one of said neutral lines and said grounding connection.

13. A system according to claim 1, wherein at least one of said communication boxes is additionally coupled to a hot line for transmission of data thereby.

14. A system according to claim 1, wherein said box is coupled to said neutral line by a wire connection.

15. A system according to claim 1, wherein said box is coupled to said grounding connection.

16. A system according to claim 1, comprising a network of a plurality of such pairs of boxes adapted for data transmission over a region.

17. A system according to claim 1, wherein said box is coupled to said neutral line by a wireless connection.

18. A system according to claim 1, wherein said system is underground and said grounding connection is to a physical ground.

19. A system according to claim 1, wherein said communication boxes are each coupled to a medium voltage cable shield for transmission of data thereby.

* * * * *